Jan. 1, 1929.
C. T. McGILL
1,697,835
BASE EXCHANGE FILTER AND SOFTENER
Filed April 3, 1926     3 Sheets-Sheet 1
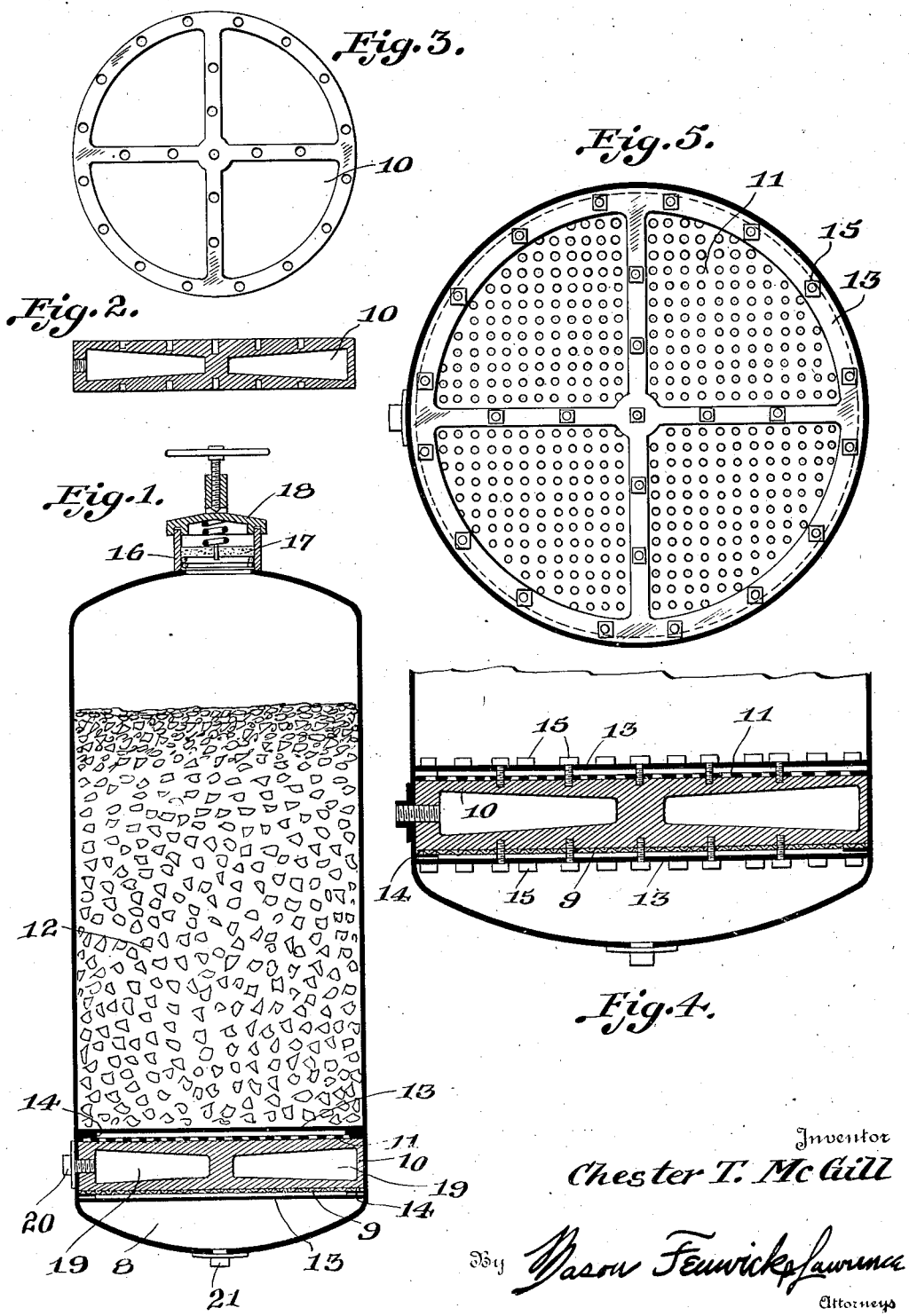
Inventor
Chester T. McGill

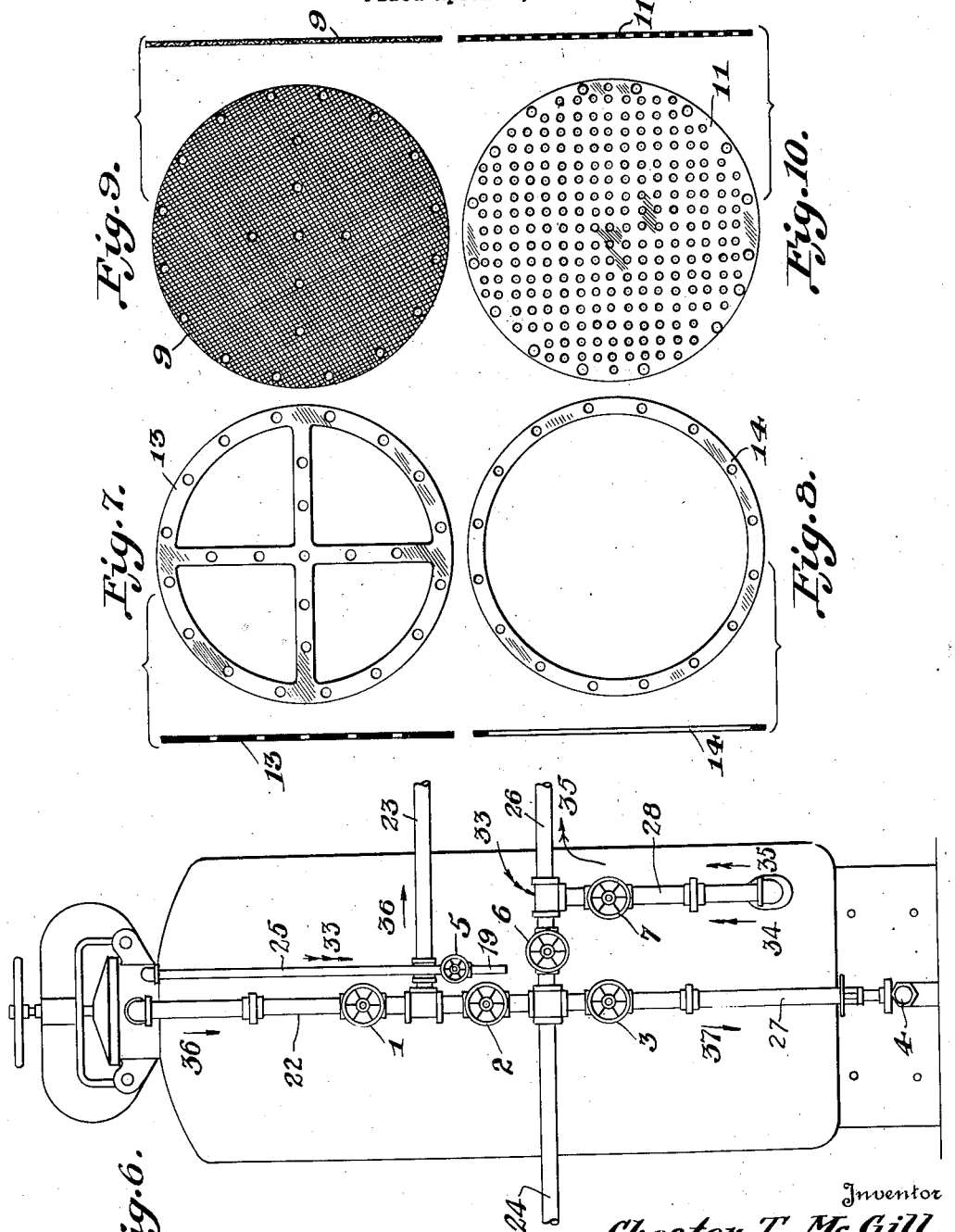

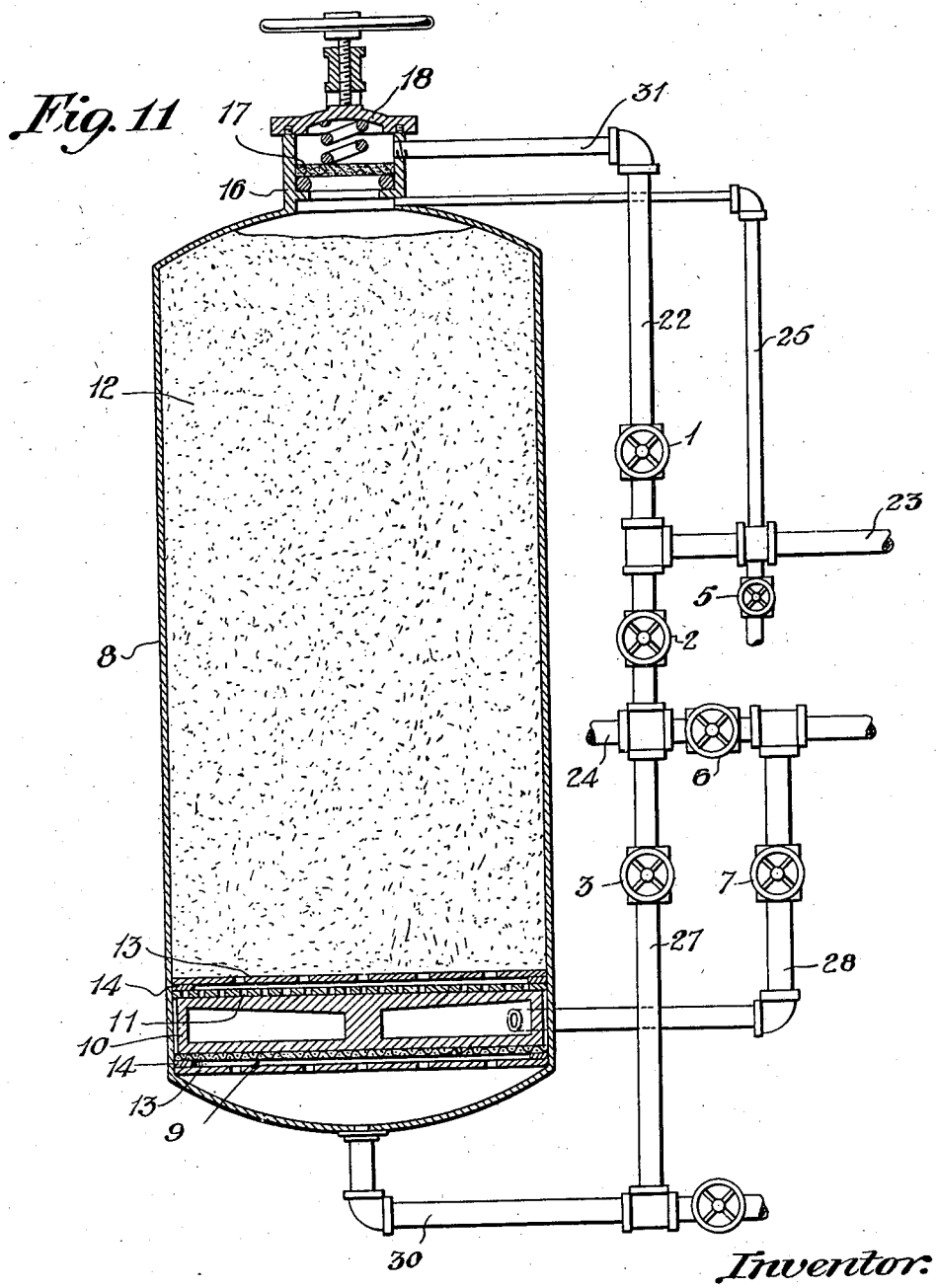

Patented Jan. 1, 1929.

1,697,835

UNITED STATES PATENT OFFICE.

CHESTER T. McGILL, OF ELGIN, ILLINOIS, ASSIGNOR TO REITER COMPANY, OF ELGIN, ILLINOIS, A CORPORATION OF ILLINOIS.

BASE-EXCHANGE FILTER AND SOFTENER.

Application filed April 3, 1926. Serial No. 99,609.

This invention relates to improvements in the art of improving the condition of the water supply for household purposes and otherwise.

One of the objects of this invention is to provide a means and method whereby the suspended solids may be removed or backwashed from the filtering material at different periods without interfering with the softening equipment.

An object of this invention is to provide a means by which the accumulation of suspended solids may be back-washed at intervals at regenerating periods without interfering with the continuous softening of the water.

It has been found in the common use of the softener, that when it is not regenerated more often than from one, two, or three months, it accumulates enough suspended matter in the filtering material from certain water supplies to breed bacteria and the object of this invention is to provide means for eliminating the possibilities of these solids remaining in the filtering material sufficiently long to prove detrimental to the health of the occupants in the household or otherwise. This invention provides a means for the filtration and removal of suspended matter. This feature has not heretofore been taken into consideration as carefully as the matter of the problem of softening of the water. The elimination of these solids as provided in this invention has been proven through experimental work to be beneficial. Some softener manufacturers recommend small capacity softeners for the purpose of eliminating the suspended solids every week or ten days as the softener is regenerated, but with this invention, a softener may be of any capacity and the new art of back-washing the filtering material without interfering with the water softening base exchange section overcomes entirely this disadvantage.

Other objects of this invention will appear from the following detailed description of the device and method, and as disclosed in the two sheets of drawings which are herewith made a part of this application.

In the drawings,

Fig. 1 illustrates a vertical sectional view of the combined filter and water softener.

Fig. 2 represents a vertical sectional view of the metal spider for carrying the filter screen and distributing plate.

Fig. 3 illustrates a plan view of the metal spider.

Fig. 4 represents a vertical sectional view of a portion of the filter and water softener showing the metal spider having attached thereto in suitable relationship the filtering screen and distributing plate.

Fig. 5 is a top plan view of Fig. 4.

Fig. 6 illustrates a vertical view of the filter and softener disclosing the supply and discharge lines, as they are under valve control, indicating the raw water entrance, the soft water discharge and the unsoftened filtered water discharge.

Fig. 7 is a plan and side elevation view of a metal ring adapted for fastening a perforated distributing plate and filter screen to the spider.

Fig. 8 represents a plan and side elevational view of the packing ring for forming a tight joint between the metal ring and the spider.

Fig. 9 represents a plan and side elevation view of a filter screen.

Fig. 10 is a plan and side elevation view of a perforated plate.

Figure 11 illustrates a sectional view through the water softener disclosing the various pipe line connections and showing by arrows the several paths taken by the water in the operation of the softener.

When in operation, valves 1, 3 and 7 are open; valves 2, 4, 5 and 6, are closed. This furnishes raw water through valve 3 into the section of filter as designated by numeral 8, from this point the water passes up through the filter screen 9, the filter screen 9 being attached to a metal spider 10, on top of which is fastened an additional perforated plate 11, through which the water rises into the zeolite material 12. Between the perforated plate 11 and the filter screen 9, a water chamber 19 is formed, the object of which will be later described. In the zeolite bed 12, the water is softened and rises through a water storage space into a top nozzle. In this nozzle, the water penetrates through a porous plate 17, which is held in place by a spring member. From the nozzle which may be termed a fill-nozzle, the water discharges into the soft water line 22 and passes down through valve No. 1, disclosed in Fig. 6 into the soft water line 23.

In further reference to the construction of the spider plate 10, filter screen 9, and distributing plate 11, it may be stated that the filtering screen 9, as well as the perforated plate 11 is detachably fastened to the spider by means of a metal ring 13. A tight joint between this metal ring and the metal spider is procured by means of a packing ring 14. The rings are fastened substantially to the spider 10 by means of tap bolts 15. When the base exchange filter and softener device as set forth in this application is adapted for the back-washing of the filter material, valve 6 is open and valve 3 closed. Then valve 4 is open, thereby allowing the raw water to pass through valve 6 down through valve 7 and into the water chamber 19, between the perforated plate 11 and the filter screen 9, and hence down through the finely woven filter screen 9, thus reversing the current through the filter screen 9, thereby washing the suspended matter therefrom and into the waste through valve 4, and providing a supply of unfiltered water to take care of soft water requirements while back-washing the filter. After the filter screen 9 has been washed sufficiently long to cleanse it, valve 4 is closed, valve 3 opened and valve 6 closed. This places the filtering portion of the equipment back into operation and supplies filtered water for the softening section and for other uses where softened water is not required.

For regenerating, open valves 2 and 6, close valves 1, 3 and 7, and open valves 4 and 5. The cap 18 is removed, the porous plate 17 is also removed, as soon as enough water has been drained out of the softener, insert salt through the fill nozzle 16. The porous plate 17 and the cap 18 are replaced and valve 1 is opened which functions to admit raw unfiltered water into the top of the softener at the fill nozzle 16. This water dissolves the salt and carries the brine solution down through the zeolite mineral and affects the usual reclaiming of the mineral thereby carrying the solids down through the bottom portion of the softener out into the drain at the rate of about one gallon a minute through valve 4, for a period of 20 to 30 minutes. Then valves 4 and 1 are closed and valves 3, 5, and 7 are opened. This allows the water to pass down to the bottom of the filter into chamber 8 and thence up through the filter material 9 into the filtered water chamber 19 through the distributing plate 11 into the mineral 12 where any remaining brine and solids are carried up through the top of the softener and out of the line at valve 5.

When the water comes soft at valve No. 5, the softener is again ready to cut into the line. Close valve 5, open valve 1 and close valves 2 and 6 and then the softener is again in operation furnishing a filtered soft water also a filtered unsoftened water. It will be understood that the finely woven screen 9 as specified in this application may be replaced by a filtros, or an alundum plate or any other suitable material commonly used in filtration.

It is apparent from the above description of the device that the raw water supply is first filtered before passing into the water chamber 19, thence into the softening zeolite mineral and after the water has passed through the zeolite mineral and the incrusting solids have been removed, the softened water before passing into the surface lines is again filtered.

Numeral 20 designates an outlet connection from the water chamber 19 for the raw filtered water, while 21 designates a raw water inlet connection.

The water after filtration, rests intermediate the filtering material and the base exchange material, and may be turned into the filtered water supply lines or up into the softening material. A water connection 20 is provided to furnish a filtered unsoftened water to the household or otherwise. This arrangement supplies any amount of water desired filtered and not softened, as well as filtered water to be softened.

It has been found by experience that when softeners are made in large enough capacity, using base exchange mineral that carries high capacities, it becomes unnecessary to regenerate the base exchange mineral more often than either sixty or ninety days, even longer in some cases. It has been found through research and experimental work that the elimination of solids as provided for in this invention, is extremely beneficial.

This invention provides an arrangement whereby a filter and a softener may be combined in the same container. That is, the filter may be back-washed and cleansed without disturbing the operation of the softener, or the softener may be regenerated and at the same time the filter may be back-washed and cleansed. This makes it possible to back-wash the filter at as frequent intervals as desired without in any way disturbing the operation of the softener. The filter above mentioned may be of any material used in standard filters such as wire cloth, alundum or any other material suitable for filtering water.

Heretofore softeners have been designed so that they would require regenerating often enough to back-wash the suspended matter and bacteria during regeneration.

In operation, as illustrated in Figures 6 and 11, valves 1—3 and 7 are open, all other valves, namely 2—4—5 and 6 are closed.

The raw unfiltered and unsoftened water from the city mains, or otherwise, enters the softener through pipe 24, valve 3, pipe line 27—30, and into the bottom of the tank into chamber 8, where the water passes through a filtering material 9, into a chamber or filter water space 19, after which this filtered water either passes up through the zeolite softener material 12 or into the filtered unsoftened water line which leads from chamber 19 through line 28, valve 7 and into line 26. That portion of the water that passes up through the zeolite mineral 12 passes through the zeolite bed through a filter plate 17, where the softened water is refiltered, and then passes into soft water line 31—22, valve 1 into line 23.

The advantage of the construction of this filter softener makes it possible to furnish a high capacity zeolite softener that will soften large quantities of water between regenerations, making it possible to utilize the full capacity of the softener tank with base exchange mineral for softening of water, with the exception of a small space required for filtering the water.

A softener may be installed with sufficient capacity to run two, three and four months, and even longer between regenerating periods. It would not be practical to operate a softener for so long a period without filtering material as at 9, for removing from the water the suspended solids and algæ, and other bacterial ingredients, and a means provided for back-washing said accumulation of foreign matter from the filtering material 9 while the softener is in operation without passing the wash water through the zeolite softening mineral 12.

The feature of being able to backwash this filtering material every few days, or as often as necessary without interfering with the operation of the softener enables the operator to remove the suspended solids, and eliminate contamination from the filtering and distributing material before bacterial growth starts to build.

This backwashing is accomplished as indicated by arrow under 32 by closing valve 3 and opening valves 6 and 4. This allows the raw water to enter the filtered water space 19 through line 24, valves 6—7, line 28 and to the water chamber 19, through the filtering material 9, chamber 8, line 30, valve 4.

Even in conditions where there was no algæ or bacteria, the suspended solids would mat so strongly over a portion of the filtering material that it would cause a resistance and would direct the water to another portion of the filtering material that had less accumulation of sediment. This would cause the water to channel and decrease the efficiency of the softener, as the water would not be distributed evenly through the zeolite mineral.

In a water softener constructed without the backwashing feature of washing the filtering material without passing the wash water through the zeolite mineral, it would be impossible to wash the matter accumulation from the filtering material where it has become matted and caked sufficiently to resist the pressure of the wash water, as the wash water with a design softener without the back-washing feature between the zeolite mineral and the filtering material would reduce the wash water pressure while passing through the zeolite mineral.

The loss of pressure of the water passing through the zeolite mineral, together with the packing and channeling of the mineral and uneven distribution of the water through the filter reduces the wash water rate of flow sufficiently that it will not thoroughly cleanse the filtering material.

In the design as outlined, this objection is overcome and full pressure is obtained to thoroughly cleanse the filtering material. This is accomplished by the full pressure being evenly spread over the entire surface of the filtering material and that the sediment is washed from the filter 9 frequently between regenerating periods, and hence is not allowed to accumulate in quantities long enough between backwashing periods to permit its becoming matted and caked on the filter 9.

In regenerating the filter softener this may be accomplished in two different ways. One by adding salt when the tank is not entirely full of zeolite mineral. This is accomplished by shutting the water softener off by closing valves 1 and 3 and opening valves 2 and 5, also either valves 4 or 7. Then remove cap 18 by loosening wheel on top and porous plate 17 and adding the required amount of salt, after which the porous plate 17 is replaced, also the cap 18 and screwed down tightly. Valve 1 is then opened which allows water to pass into the top of the softener down through the filter porous plate 17, zeolite mineral 12, carrying the brine solution into chamber 19 where it passes from the tank either into line 28 valve 7, line 26 to the drain, or through filter 9, space 8, line 30, valve 4, to the drain.

After a sufficient amount of the brine solution has passed through the base exchange mineral, valve 1 is closed and valve 5 is opened, the water is drained from the softener either from valve 4 or valve 7 after which said valve is then closed. Then valve 3 is opened, this allows the water to flow into the bottom of the softener through line 27—30, water chamber 8, filter 9, filtered water space 19, up through perforated plate 11, zeolite mineral 12, and as soon as water starts to come from valve 5 clear and soft this valve is closed and valve 1 is opened, and the filter softener is again furnishing filtered and softened water.

Another method of regenerating is as follows: When the tank is filled with zeolite mineral, and space is insufficient for adding salt at the top, or when it is more desirable to add a brine solution rather than the salt, then the brine solution may be admitted at the top through the fill nozzle, after which the porous plate and cap may be replaced and securely fastened down and the brine solution then washed from the softener tank by passing water through valves 6 and 7, line 28, water chamber 19, up through the zeolite mineral, out to the drain through line 25, valve 5, and line 29.

It is apparent from the above description and function of the device that the top filter portion 17 may be back-washed without passing the washing water through the zeolite mineral 12 by merely opening valve 2 and valve 5, which passes the raw water from line 24, through valve 2, valve 1, line 22 and line 31 into the fill nozzle 16 above the filter 17, where the water penetrates through the filter 17 thereby removing the suspended solids upon the opposite side of filter 17 and passes out through line 25, valve 5, line 29.

This invention makes it possible to construct a softener in any size desired as the means for backwashing the filtering material and disposing of the suspended or bacteria matter, may be operated frequently without disturbing the softener section or requiring shutting off for regenerating purposes.

In backwashing by means of this invention the water is not admitted at the top of the exchange mineral therefore eliminating the usual packing of mineral due to downflow and pressure so commonly objectionable in water softeners.

In operation this invention provides a means for keeping the mineral clean and free from packing effects, inasmuch as there would be no back pressure appreciably on the mineral, thereby greatly prolonging the life, utility and efficiency of the base exchange mineral.

In addition, a prime advantage of this invention is that backwashing may be accomplished both downward and upward at the same time, for it is apparent that after the salt has been added and the flow of liquid or brine solution has been downward from 20 to 30 minutes, valve 1 is closed, valves 4 and 6 opened wide, valve 5 opened part way to regulate a flow of 2 to 3 gallons per minute. This operation delivers raw water into water chamber 19, and down through filtering screen 9 and through the drain at 4, thereby backwashing the screen and freeing it from suspended and bacterial matter. During this operation water is also flowing from chamber 19 at a moderate rate through the mineral thereby removing any of the remaining salt solution and hardness such as lime and calcium that has been released from the base exchange mineral. These solids are carried through valve 5 to the drain.

The various methods of regenerating and other uses of the device, according to this invention, are limited only by the structural features involved, and it is to be understood that many changes and modifications may be made in the form of embodiment of this invention, within the scope of the appended claims without in any manner departing from the spirit of the invention.

What I claim is:

1. In a base exchange water softener, comprising a tank, a filter, a distributing plate above the filter in the tank, a spider for spacing the filter and plate, thereby forming a water chamber, a water connection at the bottom of the tank for admitting the water to be filtered and softened, the chamber being adapted to hold filtered water, a softened water connection to service near the top of the tank, a water connection to service directly from the chamber, thereby making it possible to furnish from the softener tank a supply of filtered unsoftened water as well as a supply of softened water, and providing a means for supplying filtered water to be softened.

2. In a base exchange softener, a perforated plate for carrying the exchange mineral, a filter for the raw water, a water chamber between the perforated plate and filter, and means whereby any suspended solids in the filtering material may be removed or backwashed from the filtering material at different periods during the operation of the softener without passing the wash water through the exchange mineral.

3. In a base exchange water softener, a perforated distributing plate for supporting the exchange mineral, a filter for the raw water, a filtered water chamber formed between the perforated distributing plate and filter, and means whereby any suspended solids in the filtering material may be removed or back-washed from the filtering material at frequent intervals without passing the wash water through the exchange mineral, whereby the packing of the exchange mineral will be eliminated on the regenerating of the softener, thereby avoiding the usual channelling effect.

4. In a water filter softener, a tank, base exchange mineral within the tank, filtering material within the tank, means for introducing water into the tank, means for filtering the water, means for supplying the filtered unsoftened water, means for back-washing the raw water filtering material and supplying softened water.

5. In a water filter softener, a tank, base exchange mineral within the tank, filtering material within the tank, means for introducing water into the tank, means for filtering the water, means for supplying filtered unsoftened water, means for back-washing the raw water filtering material and supplying softened water, a soft water space above the base exchange mineral, means for filtering the softened water, means for back-washing the soft water filtering material.

6. In a water filter softener, a tank, base exchange mineral within the tank, filtering material within the tank, means for introducing water into the tank, means for filtering the water, means for supplying filtered unsoftened water, means for back-washing the raw water filtering material and supplying softened water, a soft water space above the base exchange mineral, means for back-washing the raw water filter and soft water filter without passing the wash water through the exchange mineral.

7. In a water filter softener, a tank, base exchange mineral within the tank, filtering material within the tank, means for introducing water within the tank, means for admitting salt into the tank, means for passing the salt solution through the base exchange mineral, means for back-washing the base exchange mineral without passing the salt solution through the filtering material, means for supplying unsoftened water during the regeneration of the softener.

8. In a water filter softener, a tank, a raw water filter, a soft water filter, a raw water chamber, a filtered water chamber, a filtered and softened water chamber, a base exchange mineral within the tank, means for passing the raw water through the filtering material to the filtered water chamber, means for passing filtered water into a filtered water supply line, means for passing filtered water into and through the base exchange mineral, means for passing the softened water through a filter before it enters the service lines.

9. In a base exchange water softener comprising a tank, a distributing plate within the tank, a filter within the tank, a water space between the filter and the distributing plate thereby forming a water chamber, the water space being adapted for holding filtered water, the receiving and discharging of brine solution and wash water, a softened water connection to service from the tank, means for passing brine solution through the base exchange mineral without passing the brine solution through the filtering material and backwashing the filtering material without passing the wash water through the base exchange mineral, means for furnishing unsoftened water and filtered softened water at the same time.

10. In a water filter softener, a tank, a raw water filter, a soft water filter, a base exchange mineral within the tank, distributing and supporting material for the base exchange mineral, a filtered water space, an unsoftened filtered water connection from the tank, a softened filtered water connection from the tank, a salt or brine solution supply and discharge connection to the tank, means for supplying water to be filtered and softened, means for supplying softened filtered water and unsoftened water at the same time, means for backwashing the filters without passing the wash water through the base exchange mineral and for passing the brine solution through the base exchange mineral without passing the brine solution through the filtering materials.

11. In a water softener, a tank, a raw water filter, a soft water filter, a distributing and supporting material for base exchange mineral, a filtered water space between the filtering material and distributing and supporting material, means for supplying water to the tank, means for supplying regenerating solution to the tank, means for supplying unsoftened filtered water, means for supplying softened filtered water from the tank, means for washing the regenerating solution from the tank, means for regenerating the base exchange mineral with a solution without passing the solution through the filtering material and backwashing the filtering material without passing the wash water or liquid through the base exchange mineral, and for supplying unsoftened water during regenerating periods, means for removing the soft water filter at regenerating periods for cleansing.

12. In a base exchange water softener, a filter, means for backwashing and cleaning the filter between regenerating periods during the operation of the softener, thereby making it possible to backwash the filter at as frequent intervals as desired, means for supplying softened filtered and unsoftened filtered water.

13. In a base exchange water softener, comprising a tank, a filter, a distributing plate, a spider for spacing the filter and plate, thereby forming a water chamber, a water connection at the bottom of the tank for admitting the water to be filtered and softened, the chamber being adapted to hold filtered water, a softened water connection to service near the top of the tank, a water connection to service directly from the chamber, thereby making it possible to furnish from the softener tank a supply of filtered unsoftened water as well as a supply of softened water, and providing a means for supplying filtered water to be softened.

14. In a water filter softener, a tank, a base exchange mineral within the tank, filtering material within the tank, means for introducing water into the tank, means for admitting salt or brine into the tank, means for washing the brine solution from the base exchange mineral and backwashing the filtering material at the same time without passing the brine solution through the filtering material.

15. In a water filter softener, a tank, a base exchange mineral within the tank, a raw water filter within the tank, a soft water filter within the tank, an inlet for the raw water, an outlet for the filtered water, an outlet for filtered softened water, means for admitting salt or brine into the tank, means for backwashing the filtering material and washing the salt or brine solution at the same time without passing the salt or brine solution through the filtering material.

In testimony whereof I affix my signature.

CHESTER T. McGILL.